United States Patent
Brady et al.

(10) Patent No.: US 9,404,220 B2
(45) Date of Patent: Aug. 2, 2016

(54) UREA-FORMALDEHYDE (UF) RESIN COMPOSITION FOR ENHANCED STABILITY, TENSILE AND TEAR STRENGTH BEFORE AND AFTER CURE

(71) Applicant: Rohm and Haas Company, Philadelphia, PA (US)

(72) Inventors: Jean M. Brady, Maple Glen, PA (US); Maureen J. Finley, Churchville, PA (US); Drew E. Williams, Blue Bell, PA (US)

(73) Assignee: Rohm and Haas Company, Philadelphia, PA (US)

(*) Notice: Subject to any disclaimer, the term of this patent is extended or adjusted under 35 U.S.C. 154(b) by 190 days.

(21) Appl. No.: 14/501,650

(22) Filed: Sep. 30, 2014

(65) Prior Publication Data
US 2015/0093513 A1    Apr. 2, 2015

Related U.S. Application Data

(60) Provisional application No. 61/884,550, filed on Sep. 30, 2013.

(51) Int. Cl.
| | | |
|---|---|---|
| *B05D 3/00* | (2006.01) | |
| *D21H 19/12* | (2006.01) | |
| *C08G 12/12* | (2006.01) | |
| *C08G 12/40* | (2006.01) | |
| *C08L 61/24* | (2006.01) | |
| *C08L 61/32* | (2006.01) | |

(52) U.S. Cl.
CPC .............. *D21H 19/12* (2013.01); *C08G 12/12* (2013.01); *C08G 12/40* (2013.01); *C08L 61/24* (2013.01); *C08L 61/32* (2013.01)

(58) Field of Classification Search
CPC ............................. D21H 19/12; B05D 3/007
See application file for complete search history.

(56) References Cited

U.S. PATENT DOCUMENTS

| | | |
|---|---|---|
| 5,670,585 A | 9/1997 | Taylor et al. |
| 5,804,254 A | 9/1998 | Nedwick et al. |
| 5,914,365 A | 6/1999 | Chang et al. |
| 6,084,021 A | 7/2000 | Chang et al. |
| 6,384,116 B1 | 5/2002 | Chan et al. |
| 7,217,671 B1 | 5/2007 | Xing et al. |
| 7,268,091 B2 | 9/2007 | Xing et al. |
| 8,053,528 B2 | 11/2011 | Shoemake |
| 8,257,554 B2 | 9/2012 | Poggi et al. |
| 2004/0219847 A1 | 11/2004 | Miller |
| 2005/0127551 A1 | 6/2005 | Uhm et al. |
| 2005/0191922 A1 | 9/2005 | Xing et al. |
| 2006/0196241 A1* | 9/2006 | Phillips .................... C05C 1/00 71/50 |
| 2006/0292952 A1 | 12/2006 | Xing et al. |
| 2007/0173155 A1 | 7/2007 | Shoemake et al. |
| 2007/0178789 A1 | 8/2007 | Xing et al. |
| 2007/0193321 A1* | 8/2007 | Phillips .................... C05C 1/00 71/28 |
| 2008/0015301 A1 | 1/2008 | Grooms et al. |

* cited by examiner

*Primary Examiner* — Robert Harlan
(74) *Attorney, Agent, or Firm* — Andrew Merriam

(57) ABSTRACT

The present invention provides aqueous urea formaldehyde resin (UF resin) compositions having a pH or 7.0 or more, preferably, 8.5 or more, and comprising the UF resin modified with from 2.5 to 15 wt. %, of at least one ammonia or volatile amine neutralized carboxylic acid group containing solution polymer or alkali soluble emulsion polymer modifier, based on total UF resin and polymer solids, wherein the polymer modifier is the reaction product of 30 to 100 wt. % of methacrylic acid, acrylic acid, maleic anhydride, a salt thereof, or mixtures thereof, wherein the solution polymer has a weight average molecular weight of from 2,000 to 16,000 and the alkali soluble emulsion copolymer has a weight average molecular weight of from 1,500 to 20,000. The compositions enable the provision of untreated glass mats having improved wet web strength to prevent mat breakage in process.

10 Claims, No Drawings

UREA-FORMALDEHYDE (UF) RESIN COMPOSITION FOR ENHANCED STABILITY, TENSILE AND TEAR STRENGTH BEFORE AND AFTER CURE

The present invention relates to urea formaldehyde resin (UF resin) compositions having a pH or 7.0 or more, modified with ammonia or volatile amine neutralized carboxylic acid group containing polymers which are the reaction product of 30 wt. % or more of methacrylic acid, acrylic acid, maleic anhydride, or a salt thereof, based on the total weight of monomers used to make the polymers, wherein the polymers are chosen from solution polymers having a weight average molecular weight of 16,000 or less and alkali soluble emulsion copolymers (resins) having a weight average molecular weight of 20,000 or less. The present invention also relates to glass mats treated with the resin compositions and methods of using the compositions to make glass mats for use in several products, such as roofing shingles.

Fiber mats, and especially glass fiber mats, are commonly made commercially by a wet-laid process which is carried out on what can be viewed as modified paper-making equipment. In this process, a fiber slurry is deposited on the moving screen or cylinder is processed into a sheet-like fiber mat by the removal of water, usually by suction and/or vacuum devices. This is followed by the application of a binder solution to the mat to hold the glass fiber mat together.

Without the use of polymeric additives to the binder, glass fiber mats are manufactured with a binder consisting essentially of a UF resin. This results in mats which are often brittle. The strength properties of such UF resin treated mats may also deteriorate appreciably in process, either before or after curing, especially when the mats are subjected to wet conditions. Thus, the cured binder containing polymeric additives desirably impart a high degree of flexibility, primary dry tensile and wet tensile strength and tear strength in the finished mat.

Prior to curing the resin in the mat, the UF resins can be self-catalyzed to undergo pre-cure, by lowering their pH in process. This can in turn increase the wet web strength of the glass mat. However, lowering the pH of a UF binder resin composition decreases the stability of the UF binder, leading to gelation and impaired flow of the binder, as well as poor binder distribution throughout the mat. Binder instability can result in inconsistent binder distribution and mat strength, machine fouling, etc. For a glass mat line in continuous operation, this can lead to costly downtime and quality control issues during production.

U.S. Pat. No. 5,670,585 to Taylor et al. discloses the use of a non-curable acidic polyacrylate as a modifier in a UF resin composition for treating glass mats wherein the acidic polyacrylate effectively minimizes ammonia ($NH_3$) emissions. The acidic polyacrylate can comprise 5-60 wt. % of the total binder solids and acts as an ammonia scavenger for the binder compositions. To avoid binding up free carboxyl groups (thereby interfering with ammonia scavenging), Taylor et al. disclose that their aqueous compositions are "devoid of significant amounts of added crosslinking agents", such as triethanolamine, glycols or glycerol and that the composition are not self crosslinking. However, the acidic polyacrylates in Taylor et al. do not enhance wet web strength of the glass mat to an acceptable degree and are not stable aqueous binders in the disclosed application.

Other binder compositions, such as high molecular weight water borne thickeners (molecular weights greater than 100,000 daltons) such as alkali soluble emulsions or hydrophobically modified ethoxylates can be used to increase uncured UF resin strength. However, such compositions exhibit a great increase in viscosity in aqueous composition with the result that they are hard to effectively apply to and evenly distribute on a wet laid glass mat.

The present inventors have endeavored to solve the problem of providing an aqueous UF resin binder composition that is stable in use conditions and, at the same time, appreciably increases the wet web strength of the glass mat treated with the binder.

1. In accordance with the present invention, aqueous urea formaldehyde resin (UF resin) compositions having a pH or 7.0 or more, or, preferably, 7.5 or more, or, more preferably, 8 or more, comprise the UF resin modified in a total polymer modifier amount of from 2.5 to 15 wt. %, preferably, 5 to 10 wt. %, based on total UF resin and polymer solids, of at least one ammonia or volatile amine neutralized carboxylic acid group containing polymer which is the reaction product of 30 wt. % or more, or, preferably, 35 wt. % or more, or, more preferably, 40 wt. % or more of methacrylic acid, acrylic acid, maleic anhydride, a salt thereof, or mixtures thereof as a carboxylic acid group containing monomer, preferably, methacrylic acid, wherein the at least one polymer is chosen from solution polymers having a weight average molecular weight of 16,000 or less, or, preferably, from 2,000 to 12,000, and alkali soluble emulsion copolymers (resins) having a weight average molecular weight of 20,000 or less, or, preferably from 1,500 to 15,000.

2. Preferably, the ammonia or volatile amine neutralized alkali soluble emulsion polymer is a copolymer comprising the copolymerization product of the methacrylic acid, acrylic acid, maleic anhydride, a salt thereof, or mixtures thereof as a carboxylic acid group containing monomer with from 30 to 70 wt. % of a nonionic comonomer, based on the total weight of monomers used to make the polymer.

3. Preferably, the ammonia or volatile amine neutralized solution polymer comprises the polymerization product of a monomer mix comprising 50 wt. % or more, or, preferably, 60 wt. % or more, of methacrylic acid, based on the total weight of monomers used to make the polymer, and the remainder of a water soluble nonionic comonomer.

4. Preferably, the binder compositions of 1, 2 or 3, above, remain stable in binder application conditions and provides improved wet web strength in comparison to UF resin binders.

5. More preferably, the binder compositions of 1, 2 or 3, above, pass a 24 hour room temperature binder composition stability test at a 2:1 (vol:vol) dilution in which 1.0 ml of the undiluted aqueous urea formaldehyde resin binder composition at 50% solids is mixed with 2.0 ml of whitewater comprising 0.06 wt. %, as solids, of a mixture of a polyacrylamide thickener and a alkylamine dispersant.

6. The compositions of 1, 2 or 3, above, may comprise a polymer or resin of methacrylic acid and at least one phosphite, phosphinate or hypophosphite group. Preferably, the phosphite, phosphinate or hypophosphite groups in the polymer or resin can be bound to two carbon atoms, as a phosphite along the carbon chain, such as a dialkyl phosphinate, or can be a terminal or pendant group.

In another aspect, the present invention provides methods comprising forming the composition in any of items 1, 2, 3, 4, 5 or 6, above, applying the composition to a wet laid continuous glass fiber mat and heating to cure the composition.

Unless otherwise indicated, all temperature and pressure units are room temperature and standard pressure.

The singular forms "a," "an," and "the" include plural referents unless the context clearly dictates otherwise. Unless defined otherwise, technical and scientific terms used herein have the same meaning as is commonly understood by one skilled in the art.

All phrases comprising parentheses denote either or both of the included parenthetical matter and its absence. For example, the phrase "(meth)acrylate" includes, in the alternative, acrylate and methacrylate.

As used herein, the term "additive" refers to materials which are added to the aqueous urea formaldehyde resin compositions of the present invention; so, additives are materials other than the ammonia or volatile amine neutralized carboxylic acid group containing polymer and UF resin.

As used herein, the phrase "based on the total binder solids" refers to weight amounts of any given ingredient in comparison to the total weight amount of all of the non-volatile ingredients in the binder. Volatile ingredients include both water and ammonia.

As used herein, the term "based on the total weight of monomers used to make the copolymer," refers to all addition monomers, such as, for example, vinyl monomers, and chain transfer agents which leave a residue in the polymer, such a hypophosphites or their salts.

As used herein, the terms "binder composition" and "aqueous urea formaldehyde resin composition" are used interchangeably.

Unless otherwise indicated, as used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used for system control, data acquisition, and data processing to chart weight average molecular weight was an Agilent ChemStation, version B.04.02 with Agilent GPC-add on version B.01.01. The column set was TOSOH Bioscience TSKgel G2500PWxl 7.8 mm ID×30 cm, 7 μm column (P/N 08020) (TOSOH Bioscience USA South San Francisco, Calif.) and a TOSOH Bioscience TSKgel GMPWxl 7.8 mm ID×30 cm, 13 μm (P/N 08025) column. A 20 mM Phosphate buffer in MilliQ™ HPLC Water, pH ~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio). For polymers which are rendered water soluble and stable at pH>7, such as alkali soluble polymers or resins, the mobile phase and polymer samples can be made at the same higher pH (>7) by addition of aqua ammonia.

As used herein, the term "nonionic monomer" refers to any vinyl monomer which does not become ionized at a pH ranging from 1-14. This includes, for example, cycloalkyl and alkyl esters of α-β ethylenically unsaturated acid monomers, hydroxyalkyl (meth)acrylates, vinyl monomers, vinyl ethers, vinyl esters, arylenes and alkyl arylenes, such as styrene.

As used herein, the term "substantially formaldehyde free" means that the indicated component or composition contains or releases 500 ppm or less of formaldehyde in use, preferably, 100 ppm or less.

As used herein, the term "binder application conditions" means ambient or room temperature and standard pressure.

As used herein, the term "wet web strength" means the uncured strength of UF resin binder treated glass mat.

As used herein, the term "wt. %" stands for weight percent.

In accordance with the present invention, the ammonia or volatile amine neutralized (meth)acrylic acid copolymer or homopolymers of the present invention are formulated as pre-neutralized solutions that contribute to the uncured strength of UF resin binder treated glass mat ("wet web strength") while retaining excellent tensile strength in the cured mat. Meanwhile, the binder compositions of the present invention remain stable for 12 hours or more, preferably 24 hours or more, and remain at reasonable viscosity levels under application conditions throughout their application to the glass mat to ensure that the wet web surface is fully treated with binder. This is very important when one takes into account the fact that UF resin crosslinking is acid catalyzed. While use of acid catalyzed UF increases the wet web strength of the resin-treated web (e.g. UF "pre-cures"), without application of heat it also hinders binder flow and application consistency to the extent that it is not desirable for mat production. Indeed, the possibility of equipment fouling and/or web breakage increase dramatically. Thus, the ammonia or volatile amine neutralized carboxylic acid group containing polymer compositions of the present invention actually can, when combined with UF resin, enhance mat strength prior to cure. Accordingly, the compositions of the present invention can provide an incipient pre-cured strength (wet web strength) that is necessary to avoid process delays and shutdowns caused by breaks in the mat. The ammonia or volatile amine neutralized carboxylic acid group containing polymer compositions of the present invention are substantially formaldehyde free. After applying the compositions to the mat, the mat is thermally cured to achieve desired integrity.

The ammonia or volatile amine neutralized methacrylic acid polymer composition of the present invention can be prepared by conventional aqueous solution or emulsion polymerization methods, including hypophosphite chain transfer polymerization of (meth)acrylic acid and, if desired, one or more comonomer such as an alkyl (meth)acrylate.

The chain transfer agents used to control polymer or resin molecular weight may include conventional water soluble chain transfer agents such as, for example, bisulfites, such as sodium meta-bisulfite, hypophosphites or their salts, such as sodium hypophosphite, or phosphate salts, such as disodium hydrogen phosphate.

Suitable acid monomers include acrylic acid, methacrylic acid and maleic acid or anhydride, preferably, methacrylic acid.

The amount of carboxylic acid group containing monomer used to make the polymer or resin ranges from 30 to 100 wt. %, or, preferably, 35 wt. % or more, or, more preferably, from 40 to 75 wt. %, based on the total weight of monomers used to make the polymer or resin. The preferred amount of carboxylic acid group containing monomer is sufficient overall to insure compatibility with the UF resin.

Suitable nonionic monomers may include vinyl monomers, alkyl (meth)acrylates, diisobutylene (DIB) and, preferably, include alkyl and hydroxyalkyl methacrylates.

Preferably, the nonionic monomer enables the polymer or resin to provide uncured wet web strength in the mat while maintaining sufficiently low viscosity of the ammonia or volatile amine neutralized polymer for ease of application. The amount of nonionic monomer used to make the polymer or resin can be from 0 to 70 wt. %, based on the total weight of monomers used to make the polymer or resin, or, preferably 25 wt. % or more, or, more preferably, 30 wt. % or more.

Preferably, to enable the mats treated with the binder compositions of the present invention to achieve both high tensile strength and limited viscosity increase of the binder (at high pH), the polymer or resin may have a broad molecular weight distribution or bimodal molecular weight. Such polymers or resins may be made by methods conventional in the art, such as by use of chain transfer agents in polymerization or by used of staged feed or staged initiation steps.

The binder compositions of the present invention may additionally comprise from 0.01 to 2 wt. %, based on the total solids of the binder compositions, of additives, including dispersants to lower viscosity and thickeners such as hydrophobic alkali soluble emulsion (HASE) thickeners or hydrophobically modified ethoxylated urethane (HEUR) thickeners.

The binder compositions of the present invention should have a viscosity of from 5 to 60 centipoises (cPs) at 25° C. at 15% solids, and 30 rpm shear rate or, preferably, 40 cPs or less, or, more preferably, 30 cPs or less.

Suitable methods of formulation the binder compositions of the present invention, the polymer can be added individually to the UF resin, or the polymer and any additives may be supplied in the form of an additive blend an added to the UF resin.

The methods of the present invention comprise treating a wet laid fibrous glass mat with the binder composition by soaking the mat in an excess of binder solution, or by coating or impregnating binder directly into the fibrous mat, e.g. with a falling film curtain coater and then curing the binder. Curing comprises heat treating the binder treated mat at from 100 to 300° C., or, preferably, from 180 to 240° C.

Preferably, the treating in the method of the present invention comprises soaking the fibrous glass mat in an excess of a binder composition, or coating or impregnating binder directly into the fibrous mat, e.g. with a falling film curtain coater.

The following examples illustrate the present invention. Unless otherwise indicated, all parts and percentages are by weight and all temperatures are in ° C.

EXAMPLES

In Table 1, below, the abbreviations are defined, as follows:

AA: acrylic acid, MAA: methacrylic acid, HASE: hydrophobically modified alkali soluble ethoxylate, BMA: butyl methacrylate, DIB: diisobutylene, HEMA: hydroxyethyl methacrylate, HPA: hydroxy propyl acrylate, EA: ethyl acrylate, SHP: sodium hypophosphite.

TABLE 1

Raw Materials

| Polymer or Resin | Carrier | Composition *contains $(Na)_2HPO_4$ **contains $H_2NaPO_2$ | Mw (1000 s) | % solids | pH |
|---|---|---|---|---|---|
| UF | Water | urea formaldehyde resin | | 65-66 | various |
| 2 | Water | Acrylic emulsion/ $NH_4OH$ | >100 | 47 | 8.5 |
| 3 | Water | Acrylic emulsion | >100 | 45.5 | 3.5 |

Thickeners

| 4 | Water | HASE EA/45MAA/Hydrophobe | 600 | 30 | 3.0 |
| 5 | Water | EA/46MAA/$NH_4OH$ | 300 | 11 | 9.3 |

ASRs[2]

| 6 | 60/40 H2O/PG | 65BMA/35MAA/ $NH_4OH$ | 15 | 35 | 9.8 |
| 7 | Water | 53DIB/47MAnh | 11 | 22 | 9.2 |
| 8 | Water | 60AA/40HPA/$NH_4OH$ | 2.2 | 49.9 | 7.0 |

TABLE 1-continued

Raw Materials

| Polymer or Resin | Carrier | Composition *contains $(Na)_2HPO_4$ **contains $H_2NaPO_2$ | Mw (1000 s) | % solids | pH |
|---|---|---|---|---|---|
| 9 | Water | 70HEMA/30MAA/ $NH_4OH$ | 12 | 35 | 8.5 |

Solution Polymers[1]

| 10 | Water | pMAA/$NH_4OH$ | 13 | 32 | 9.5 |
| 11 | Water | pAA/$NH_4OH$ | 2.4 | 35.4 | 6.7 |
| 12 | Water | pAA/$NH_4OH$ | 4.5 | 46.8 | 4.0 |
| 13 | Water | 70AA/30MAA | 3.5 | 48.4 | 4.1 |
| 14 | Water | 91MAA/9SHP/$NH_4OH$ | 5 | 42 | 7.5 |
| 15 | Water | 45AA/55MAA (SHP)/ $NH_4OH$ | 10 | 50 | 7.5 |
| 16 | — | propylene glycol | | 0 | |

[1]Weight average molecular weight determined by size exclusion chromatography (SEC) in the manner set forth, above, for GPC molecular weight determination except that these were buffered in 20 mM phosphate buffer at concentration of about 1 mg/ml (based on solids), then filtered using 0.45 µm filter aqueous mobile phase at a high enough pH to ensure polymer solubility in water, using an HPLC system equipped with Agilent components Model G1310A Pump, Model G1316A Column heater, Model G1367A Autosampler ™ injection sampler, Model 1379A Degasser, each calibrated as set forth in the user manual. The SEC column set was composed of one TSKgel G2500PWxl column (7.8 mm ID × 30 cm, 6 µm) and one TSKgel GMPWxl column (7.8 mm ID × 30 cm, 13 micron) purchased from TOSOH Bioscience.
[2]For ASRs, the Weight Average Molecular weight was determined in the manner set forth, above, except that the ASR material was neutralized with ammonia to ~pH 9 render it water soluble.

Binder Compositions: Binders were formulated by simple mixing using the materials indicated in Table 1, above, to make the blends outlined in Table 2, below. The blends are further diluted to 15-20% solids aqueous solutions, before applying to glass mat. The blends are used within 24 hours of formulation. To help minimize confounding the test method data with aging effects of UF resins, data sets were gathered using fresh UF resin (less than 1 months old from source, stored under refrigeration). In addition, any new lots of UF were run as additional control samples.

Mat Production: Glass mats were made using wet laid methods (~7g chopped glass fiber (~3.7 cm length) was slurried in 18.93 L (5 gal) whitewater comprising about 0.06 wt. %, based on total solids, of a mixture of polyacrylamide thickener and alkylamine dispersant and the slurry was agitated vigorously for up to 10 min and dropped onto a scrim, with suction underneath to remove excess water and form the mat. The resulting mat is trimmed to form a 33 cm×33 cm (13 in×13in) square. Each binder composition is then applied by dipping the mat in the binder composition to form an uncured treated mat. Each treated mat was made to have a target LOI of 15-19 wt. % loss on ignition ("LOI"). Actual LOI is reported below.

Each uncured treated mat was evaluated for wet web strength in the manner described below.

Each treated mat was cured at 204° C. for 120 seconds in a forced air oven, without any pre-drying. Each cured mat basis weight was about 8.0 kg/100 m[2] (1.63 lb/100 ft*ft mat). Each cured mat was cut into 2.54 cm (1 in) by 12.70 cm (5 in) strips and tested for tensile strength in the machine direction using a Thwing Albert Tensile Tester (Thwing Albert Instrument Company, West Berlin, N.J.) equipped with a 1 kN load cell. Tensile strength testing is described, below.

Test Methods: The following test methods for the binder compositions are used to evaluate the binder compositions. Results appear in Table 3, below.

Wet Web Strength: Wet web strength is measured by placing an uncured treated mat horizontally over a sheet of plastic with a round opening in the center. Then weights were continuously added to the center of the mat to elongate the uncured mat until the handsheet reached a set vertical distance below the round opening, the distance being less than half of the diameter of the round opening. The wet web strength was determined as the weight of the load that is required to reach this elongation distance. The figure reported is the average value of a total of four trials run for each example tested.

Wet Web Delta: Represents the contribution of the binder composition to UF resin treated wet web strength. To foster comparisons of wet web strengths at varying pH, the difference ("delta") between binder wet web strength and UF resin wet web strengths is calculated at the appropriate pH. A control or base value of wet web strength for UF resin treated mat (164g for a pH of 7.0 or above; and 240 g for a pH of below 7.0) is subtracted from the measured wet web strength for the indicated binder composition. Wet web strength delta values which are calculated to be negative are set to zero.

Tensile & Tear Strength Evaluations of Cured Glass Mat: Tensile testing was carried out on 2.54×12.7 cm (1×5 in) strips, cut from cured treated glass mats. A Thwing Albert tensile tester run at 0.423 mm/s (1 in/min) jaw separation speed, using a fixture gap of 7.62 cm (3 in), and a crosshead speed was 2.54 cm/min (1 in/min). Load break sensitivity was set at 20%.

Dry tensile strength: Test strips of cured treated glass mat were tested at room temperature (23C). Data is reported in mass (g or Kg) per 2.54 cm strip width. Tensile strengths were recorded as the peak force measured during parting. For each binder composition tested, data reported are averages of values recorded from measuring 10 strips, with 5 strips each taken from 2 separate treated and cured mats.

Hot wet tensile strength: Test strips of cured treated glass mat were submerged in 85° C. water for 10 min, removed, blotted dry, then tested at 23C ambient temperature while still wet/warm). Data is reported in mass per strip width or % of dry tensile strength retained in not wet tensile measurement. Tensile strengths were recorded as the peak force measured during parting. For each binder composition tested, data reported are averages of values recorded from measuring 10 strips, with 5 each taken from 2 separate treated and cured mats.

Tear Strength: For each binder composition, 6.4 cm×7.6 cm (2.5×3.0 inch) rectangles of cured treated mat are notched with a razor and tested for resistance to tear, using falling pendulum methods (23° C., four samples/condition). Data reported was g force required to tear the sample (propagate crack from the notch point), and for each composition tested is the average of 4 total samples taken from 2 separate cured mats. The same mats in these tests were subsequently used to determine loss on ignition.

LOI (loss on ignition): Was tested for each cured glass mat via charring the rectangle from tear strength testing in a 650° C. furnace for 4-6 min to measure its organic content. LOI is the percent weight loss upon charring divided by initial weight of cured mat (multiplied by 100%). This value is calculated as the percent weight loss upon charring divided by initial weight of cured mat (multiplied by 100%).

% Loss on Ignition (LOI): (weight loss upon charring)/ (initial weight of cured mat sample).

Binder Composition Stability to Dilution With Whitewater:

Each aqueous urea formaldehyde resin of the present invention was diluted with whitewater in test tubes, and tested for stability (Tables 4A and 4B). Unstable solutions are defined as those which develop sediment/film, gel, or phase separation. The results are considered to be progressively unstable as phase separation and sediment/film forms, which ultimately cannot be redispersed. The system is particularly unstable is the sediment/film persists with agitation (test tube inversion). For the 2:1 test 1.0 ml of each undiluted aqueous urea formaldehyde resin composition was mixed in a test tube with 2.0 ml of whitewater comprising 0.06 wt. %, as solids, of a mixture of a polyacrylamide thickener and a alkylamine dispersant, and tested for stability after 24 hours at room temperature. Results are presented in Table 4A, below. For the 5:1 test 1.0 ml each aqueous urea formaldehyde resin composition as above in the 2:1 test is mixed with 5.0 ml of the whitewater in a test tube and tested for stability after 24 hours at room temperature. Results are presented in Table 4B, below.

Stability Rating System: The data reported in Tables 4A and 4B, and associated abbreviations are as follows:

Homogeneity refers to whether the binder mixture is in a single liquid phase (homogeneous) or phase separated into two liquid phases (generally present as 2 layers). Ratings are H (homogeneous) or S (separated).

Sedimentation refers to the accumulation and degree of sediment in a binder mixture Ratings are N.S. (no sediment or film on top of sample); F (film forms at a liquid surface); S (sediment present).

Redispersibility: Tests how sediment or film responds when test tube is inverted.

Ratings are D (sediment/film disperses, resulting in clean test tube bottom; D.N.D. (sediment/film does not disperse, but persist even with test tube inversion).

The term "swirl" is used to describe situation when solution does not have distinct multiple layers of liquid or solid phases present, but nonetheless there appears to be some slight level of clear liquid/clear liquid phase incompatibility.

Unstable solutions are defined as those which develop sediment, gel, or phase separation. The results are considered to be progressively unstable as phase separation and sediment/film forms. The system is particularly unstable is the sediment/film persists with agitation (test tube inversion).

TABLE 2

Aqueous UF Binder Compositions (wt. % solids)

| Example | UF Resin (wt. % solids) | Polymer Modifier: material | wt. % (solids) | UF pH | Binder pH | Visc[1] |
|---|---|---|---|---|---|---|
| C1 | 100 | none | 0 | 7.5 | 7.5 | 16[2,3] |
| C2 | 100 | none | 0 | 7.2 | 7.2 | — |
| C3 | 90 | 2 (emulsion) | 10 | >7.5 | >7.5 | 15[2,3] |
| C4 | 100 w/H$_2$SO$_4$ | none | 0 | 3.7 | 3.7 | 14 |
| C5 | 100 | none | 0 | 7.3 | 7.3 | 16 |
| C6 | 100 | none | 0 | 7.3 | 7.3 | 14 |
| C7 | 100 | none | 0 | 3.7 | 3.7 | — |
| C8 | 100 | 16 | 5.5 | 7.8 | 7.8 | 15 |
| 1 | 94.5 | 7 | 5.5 | 7.3 | 7.2 | 14 |
| 2 | 94.5 | 9 | 5.5 | 7.3 | 7.5 | 12 |
| 3 | 94.5 | 8 | 5.5 | 7.3 | 7.4 | 13 |
| 4 | 94.5 | 10 | 5.5 | 7.3 | 7.9 | 13 |
| 5 | 94.5 | 11 | 5.5 | 7.3 | 7.5 | 12 |
| 6C | 100 | 6 | 3.5 | 7.5 | >7.5 | 19.4[2] |
| 7 | 100 | 6 | 5.5 | 7.2 | 7.8 | 13.5 |
| 8 | 90 | 6 (with 4.5 wt. % of 2) | 5.5 (10 total) | 7.2 | 7.8 | 13.3 |
| 9 | 84.5 | 6 (with 10 wt. % of 2) | 5.5 (15.5 total) | 7.2 | 7.8 | 13.6 |
| 10 | 94.5 | 15 | 5.5 | 7.3 | 7.7 | 16 |
| 11 | 94.5 | 14 | 5.5 | 7.3 | 7.7 | 12 |

[1]Unless otherwise indicated: Viscosity in cP at 25° C. at 15% solids, 30 rpm.
[2]Viscosity in cP at 25° C. at 20% solids, 30 rpm.
[3]Clear fluid.
— Not measured.
Table 2 gives solids fractions of components.

As indicated in Table 2, above, the inventive (co)polymers and alkali soluble resins can be used at higher loading levels (5.5% or higher), while retaining acceptable viscosities.

TABLE 3

Mechanical Performance of uncured and cured Binder Compositions, including Effect of binder pH on Wet Web and Tensile Strength.

| Case # | [ID #] | % LOI | Wet web strength (g) | Wet Web Delta (g) | Dry Tensile Strength (Kg) | % retained tensile strength wet/dry | Tear Strength (g) |
|---|---|---|---|---|---|---|---|
| C1 | 1 | 16.0 | 141 |  | 13.18 | 64 | 360 |
| C2 | 29 | 17 | 186 | 22 | 12.73 | 62 | 365 |
| C3 | 3 | 17.1 | 214 |  | 11.36 | 77 | 430 |
| C5 | 35 | 14 | 139 | 0 | 8.86 | 63 | 425 |
| C6 | 39 | 15 | 149 | 0 | 11.73 | 74 | 483 |
| C7 | 51 | 15 | 240 | 0 | 12.78 | 82 | 419 |
| C8 | 30 | 15 | 156 | 0 | 11.45 | 67 | 360 |
| 1 | 34 | 17 | 250 | 86 | 12.78 | 70 | 451 |
| 2 | 40 | 17 | 228 | 64 | 13.14 | 70 | 475 |
| 3 | 41 | 16 | 241 | 77 | 12.59 | 79 | 488 |
| 4 | 42 | 15 | 269 | 105 | 12.50 | 75 | 408 |
| 5 | 44 | 14 | 227 | 63 | 12.86 | 74 | 460 |
| 6C | 28 | 12 | 189 | 25 | 8.64 | 65 | 502 |
| 7 | 31 | 18 | 281 | 117 | 12.28 | 69 | 408 |
| 8 | 32 | 14 | 264 | 100 | 11.36 | 78 | 424 |
| 9 | 33 | 15 | 233 | 69 | 12.73 | 59 | 365 |
| 10 | 56 | 19 | 273 | 109 | 13.59 | 76 | 439 |
| 11 | 57] | 16 | 263 | 99 | 14.18 | 72 | 413 |

As indicated in Table 3, above, at Example 6C, the amount of polymer modifier needed to insure that it contributes to wet web strength is more than 3.5 wt. %, based on total binder composition solids. The inventive polymer modifiers of Examples 1 to 5 and 7 to 11 can be a variety of ammonia or volatile amine neutralized solution copolymers or homopolymers and alkali soluble resins having low molecular weights and at least 35 wt. % of copolymerized acid monomers, based on the total weight of monomers used to make the polymer or resin. In particular, the copolymer or homopolymer modifiers of methacrylic acid of inventive Examples 4, 7, 8, 9 and 10-11 exhibit very high contributions to wet web strength. More surprisingly, as shown in inventive Examples 3 and 5 even low molecular weight acrylic acid polymer modifiers contribute to wet web strength. The inventive binder compositions also provide acceptable contributions to wet web strength at a high pH at which the UF resin is stable. Notice that a UF resin "pre-cure" at low pH is demonstrated by the increase in plain UF resin wet web strength at low pH (240 g at pH 3.7 in comparative Example C7 vs. 150-190 g at pH 7.2 in comparative Examples C2 and C6).

To show that the stability of modified UF resin binder compositions is favored, the modified UF resin blends, diluted with whitewater, are tested for stability. Unstable solutions are defined as those which develop sediment, gel, or phase separate.

TABLE 4A

Stability of Modified UF Resin Diluted 2:1 (w/w) With Whitewater (Binder Composition pH as noted)

| Composition | pH of Binder Comp | 1 hour @ 23° C. | 3 hour @ 23° C. | 24 hour @ 23° C. |
|---|---|---|---|---|
| 4C1 White water |  | HNSD | HNSD | HNSD |
| 4C2 UF resin at pH 7.3 |  | swirl HNSD | swirl HNSD | swirl HNSD |
| 4C3 UF resin acidified to pH 3.7 |  | SDND | SDND | SDND |
| 4C4 UF resin and 10 wt. % modifier 2 | 8.5 | HNSD | HNSD | HNSD |
| 4-1 (control) UF 413 F and 5.5 wt. % modifier 14 | 2.7 | SDND | SDND | SDND |
| 4-1A same as 4-1 different pH | 7.5 | swirl HNSD | HSD | SDND |
| 4-1B same as 4-1 different pH | 9.5 | swirl HNSD | swirl HNSD | swirl HNSD |
| 4-2 (control) UF 413 F + 5.5 wt. % modifier 15 | 2.7 | SDND | SDND | SDND |
| 4-2A same as 4-2 | 7.5 | swirl HNSD | swirl HNSD | SDND |
| 4-2B same as 4-2 | 9.5 | swirl HNSD | swirl HNSD | SDND |
| 4-3 UF resin and 5.5 wt. % modifier 10 | 9.5 | swirl HNSD | swirl HNSD | HSD |
| 4-4 UF resin with 4.5 wt. % modifier 6 | 9.8 | swirl HNSD | swirl HNSD | HNSD |
| 4-5 UF resin with 5.5 wt. % modifier 6 | 9.8 | swirl HNSD | swirl HNSD | HNSD |
| 4-6 UF resin with 5.5 wt. % modifier 7 | 9.2 | swirl HNSD | swirl HNSD | swirl HNSD |
| 4-7 UF resin with 5.5 wt. % modifier 8 | 7 | swirl HNSD | swirl HNSD | HSDND |
| 4-8 UF resin with 5.5 wt. % modifier 9 | 8.5 | swirl HNSD | swirl HNSD | swirl HNSD |

TABLE 4B

Stability of Modified UF Resin Diluted 5:1 (w/w) With Whitewater (Binder Composition pH as noted)

| Composition | pH of aqueous UF resin comp | 1 hour @ 23° C. | 3 hour @ 23° C. | 24 hour @ 23°C. |
|---|---|---|---|---|
| 4C1 White water |  | HNSD | HNSD | HNSD |
| 4C2 UF resin at pH 7.3 |  | swirl HNSD | swirl HNSD | HSD |
| 4C3 UF resin acidified to pH 3.7 |  | SDND | SDND | SDND |
| 4C4 UF resin and 10 wt. % modifier 2 | 8.5 | HNSD | HNSD | HNSD |
| 4-1 (control) UF 413 F and 5.5 wt. % modifier 14 | 2.7 | SDND | SDND | SDND |
| 4-1A same as 4-1 different pH | 7.5 | swirl HNSD | swirl HNSD | HSDND |
| 4-1B same as 4-1 different pH | 9.5 | swirl HNSD | swirl HNSD | HSD |
| 4-2 (control) UF 413 F and 5.5 wt. % modifier 15 | 2.7 | SDND | SDND | SDND |
| 4-2A same as 4-2 | 7.5 | swirl HNSD | swirl HNSD | HSDND |
| 4-2B same as 4-2 | 9.5 | swirl HNSD | swirl HNSD | HSD |
| 4-3 UF resin and 5.5 wt. % modifier 10 | 9.5 | swirl HNSD | swirl HNSD | HSDND |
| 4-4 UF resin with 4.5 wt. % modifier 6 | 9.8 | swirl HNSD | swirl HNSD | swirl HNSD |
| 4-5 UF resin with 5.5 wt. % modifier 6 | 9.8 | swirl HNSD | HSND | swirl HSD |
| 4-6 UF resin with 5.5 wt. % modifier 7 | 9.2 | swirl HNSD | swirl HNSD | swirl HNSD |
| 4-7 UF resin with 5.5 wt. % modifier 8 | 7 | swirl HNSD | swirl HNSD | HSD |
| 4-8 UF resin with 5.5 wt. % modifier 9 | 8.5 | swirl HNSD | swirl HNSD | HSD |

As shown in Tables 4A and 4B, above, compositions 4C3 of UF resin and binder compositions 4-1 and 4-2 of UF resin modified with a solution polymer modifier of a carboxyl acid group containing monomer or an alkali soluble emulsion copolymer modifier will at a pH≤3.7 set up within 1 hour at room temperature at 2:1 and 5:1 dilutions in whitewater. Thus, aqueous UF resin composition and aqueous binder compositions are unstable at low pH, most likely undergoing "pre-cure" or gelation, likely arising from UF "pre-cure". As shown in Examples 4-1A, 4-1 B, 4-2A, 4-2B, and 4-3 to 4-8, the stability of aqueous UF resin compositions modified with the modifiers of the present invention increases as the binder composition pH increases from 2.7 to 9.5; that is, the inventive polymer modifiers are more stable with more ammonia or volatile amine neutralized carboxylic acid groups. As shown in Examples 4-4, 4-5, and 4-6 of Tables 4A and 4B, at pH 9.5 the polymer modifiers that are most stable are copolymers comprised of substantial levels of copolymerized nonionic monomer, such as the modifiers 6, 7 and 8 in Table 1, above, each of which contain >30 wt. % nonionic comonomer.

Not shown in Example 4-7 of Tables 4A and 4B, an ammonia or volatile amine neutralized carboxylic acid group containing polymer modifier 8 has only 3 hour stability at a pH of 7; however, this is 3 hrs. one has to run a wet laid glass mat without worry of losing wet web strength from the binder composition. Accordingly, to insure their utility in making binder treated glass mats, UF resin modifiers should be used at a pH<7.0.

We claim:

1. An aqueous urea formaldehyde resin (UF resin) composition having a pH or 7.0 or more and comprising the UF resin modified in a total polymer modifier amount of from 2.5 to 15 wt. %, based on total UF resin and polymer solids, of at least one ammonia or volatile amine neutralized carboxylic acid group containing polymer which is the reaction product of 30 wt. % or more of methacrylic acid, acrylic acid, maleic anhydride, a salt thereof, or mixtures thereof as a carboxylic acid group containing monomer, wherein the at least one ammonia or volatile amine neutralized carboxylic acid group containing polymer is chosen from a solution polymer having a weight average molecular weight of from 2,000 to 16,000 and alkali soluble emulsion copolymers (resins) having a weight average molecular weight of from 1,500 to 20,000.

2. The aqueous urea formaldehyde resin composition as claimed in claim 1, wherein the total polymer modifier amount ranges from 5 to 10 wt. %, based on total UF resin and polymer solids.

3. The aqueous urea formaldehyde resin composition as claimed in claim 1, wherein the at least one ammonia or volatile amine neutralized carboxylic acid group containing polymer is the reaction product of 35 wt. % or more of a carboxylic acid group containing monomer.

4. The aqueous urea formaldehyde resin composition as claimed in claim 1, wherein the carboxylic acid group containing monomer is methacrylic acid or its salt.

5. The aqueous urea formaldehyde resin composition as claimed in claim 1, wherein the ammonia or volatile amine neutralized carboxylic acid group containing polymer is chosen from a solution polymer from 2,000 to 12,000, and an alkali soluble emulsion copolymer having a weight average molecular weight of from 1,500 to 15,000.

6. The aqueous urea formaldehyde resin composition as claimed in claim 1 which has a pH of 8 or more.

7. The aqueous urea formaldehyde resin composition as claimed in claim 1, wherein the ammonia or volatile amine neutralized alkali soluble emulsion polymer is a copolymer comprising the copolymerization product of the methacrylic acid, acrylic acid, maleic anhydride, a salt thereof, or mixtures thereof as the carboxylic acid group containing monomer with from 30 to 70 wt. % of a nonionic comonomer, based on the total weight of monomers used to make the ammonia or volatile amine neutralized carboxylic acid group containing polymer.

8. The aqueous urea formaldehyde resin composition as claimed in claim 7, wherein the ammonia or volatile amine neutralized solution polymer comprises the polymerization product of a monomer mix comprising 50 wt. % or more of methacrylic acid, based on the total weight of monomers used to make the polymer, and the remainder of a water soluble nonionic comonomer.

9. The aqueous urea formaldehyde resin composition as claimed in claim 1, wherein the composition passes a 24 hour room temperature binder composition stability test at a 2:1 (vol:vol) dilution in which 1.0 ml of the undiluted aqueous urea formaldehyde resin composition at 50% solids is mixed with 2.0 ml of whitewater comprising 0.06 wt. %, as solids, of a mixture of a polyacrylamide thickener and a alkylamine dispersant.

10. A method of using the aqueous urea formaldehyde resin composition as claimed in claim 1, comprising forming the composition, applying the composition to a wet laid continuous glass fiber mat and heating to cure the composition.

* * * * *